United States Patent [19]

Kuecker et al.

[11] Patent Number: 4,891,528
[45] Date of Patent: Jan. 2, 1990

[54] MICROPROCESSOR-CONTROLLED APPARATUS FOR DETECTING AND GUIDING A WEB WHEREIN RIGHT AND LEFT EYESPOTS ARE FORMED TO DETERMINE RIGHT AND LEFT EDGES

[75] Inventors: Charles A. Kuecker, Cary; Gary M. Klawinski, McHenry, both of Ill.

[73] Assignee: Crosfield Ebway, Inc., Wauconda, Ill.

[21] Appl. No.: 328,053

[22] Filed: Mar. 23, 1989

[51] Int. Cl.⁴ .................. G01N 21/86; G01V 9/04
[52] U.S. Cl. .................................. 250/548; 250/557
[58] Field of Search ............... 250/548, 557, 560, 561, 250/571, 572; 356/399, 400

[56] References Cited

U.S. PATENT DOCUMENTS 4,341,453  7/1982  Rubin .................................. 250/560
4,728,800  3/1988  Surka .................................. 250/548
4,795,913  1/1989  Blessing et al. ...................... 250/561

Primary Examiner—David C. Nelms
Assistant Examiner—William Oen
Attorney, Agent, or Firm—Gerstman & Ellis, Ltd.

[57] ABSTRACT

An apparatus for detecting and guiding a web includes a web scanner bar unit that extends across the entire width of the web path for controlling a steering mechanism to maintain a more precise edge and/or center alignment. The web scanner bar unit is formed of an infrared light-emitting diode array and a phototransistor array formed on opposite sides of the web. A microprocessor-based controller unit is provided for controlling the operation of the web scanner bar unit to form right and left eyespots in order to determine the respective right and left edges of the web. Further, the web scanner bar unit is capable of detecting a break in the intermediate area of the web.

20 Claims, 5 Drawing Sheets

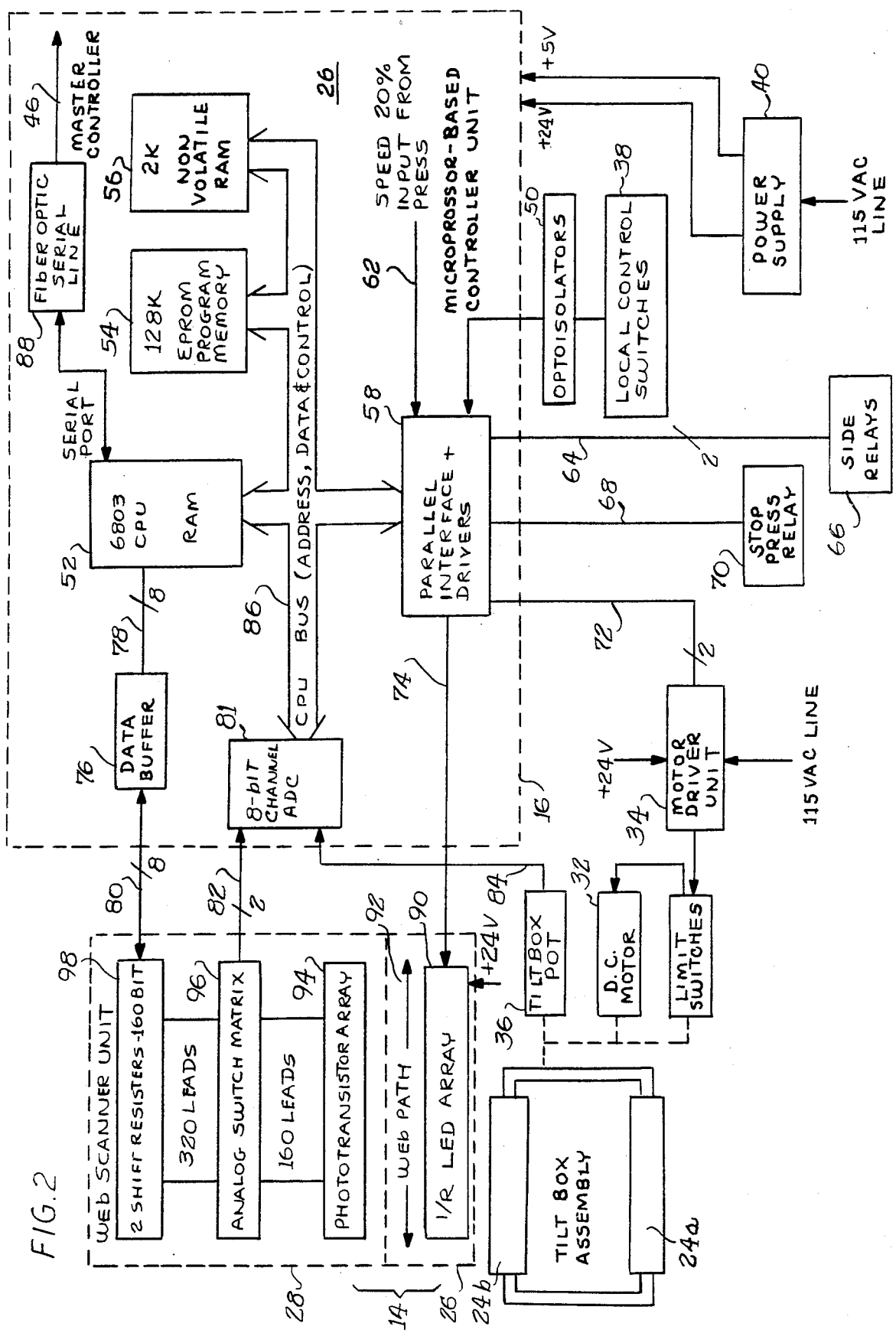

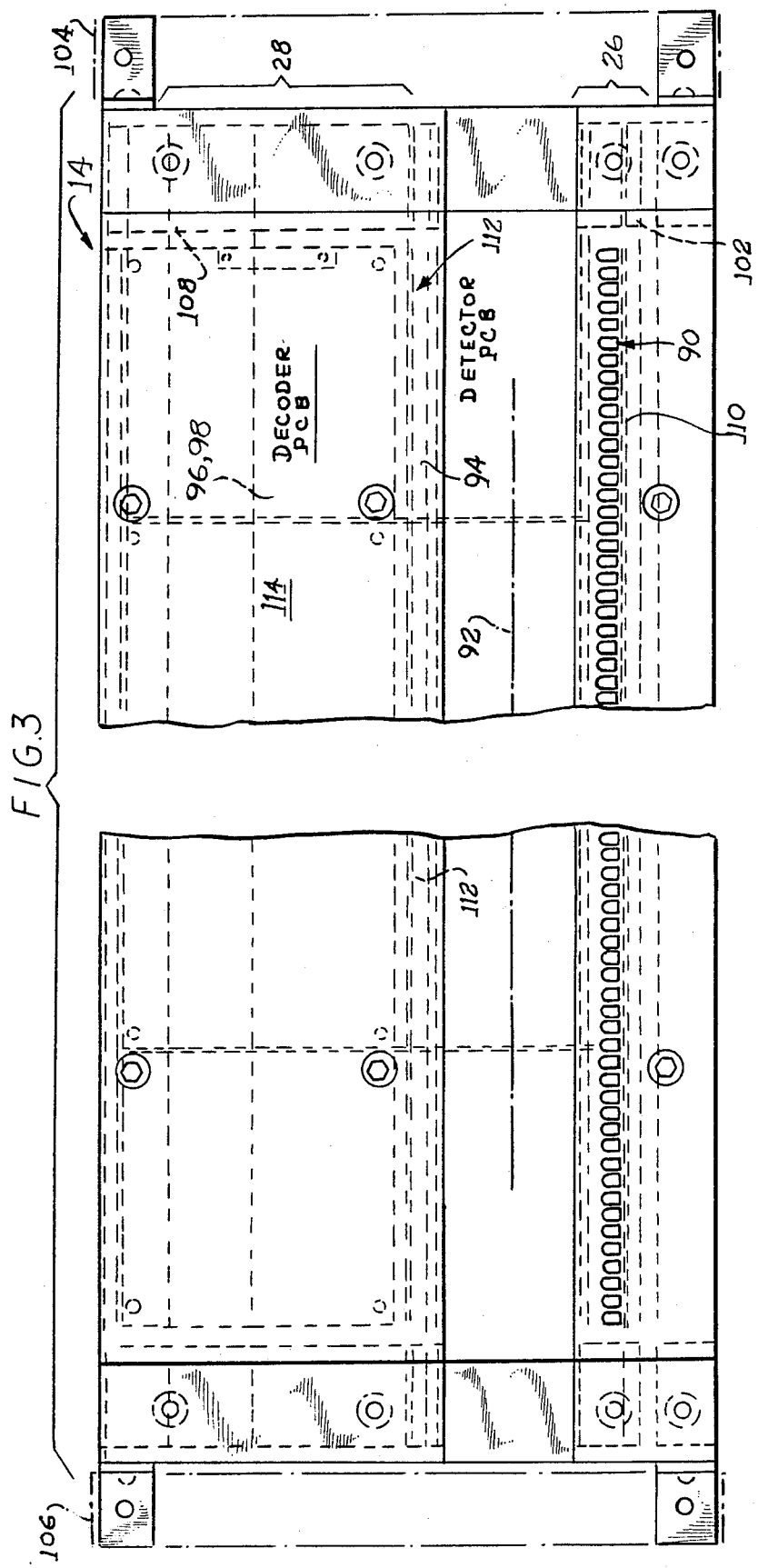

MICROPROCESSOR-CONTROLLED APPARATUS FOR DETECTING AND GUIDING A WEB WHEREIN RIGHT AND LEFT EYESPOTS ARE FORMED TO DETERMINE RIGHT AND LEFT EDGES

BACKGROUND OF THE INVENTION

This invention relates generally to web guiding devices and systems and more particularly, it relates to an apparatus for detecting and guiding a web which includes a web scanner bar unit that extends across the entire width of the web path for controlling a steering mechanism to maintain a more precise edge and/or center alignment. In one particular application, the web detecting and guiding apparatus of the present invention is utilized in a high speed continuous web printing press for the purpose of continuously controlling the lateral position of the paper web as it is passed through the press.

During the manufacturing and processing of web-like or sheet-like materials, it is well known in the prior art to employ an edge sensing device which senses the position of one edge of the web or strip and a steering means is actuated when the web deviates more than a predetermined distance from the one edge it is designed to follow. Also, a pair of edge sensing devices located on opposite edges of the web are used when it is desired to guide along an established line taken through the center of the web. Typically, the edge sensing devices consist of a light source and light-responsive detector which must be initially positioned by manual adjustment so as to be in its correct or in register position with the edge of the web. This results in time-consuming labor costs. Further, these edge sensing devices are not well adapted for accommodating webs of varying widths because, in such event, the sensing devices must be again manually re-adjusted either inwardly or outwardly so as to be in register with the side edges of the new web of different width being run.

Moreover, the prior art edge sensing devices are not capable of detecting a break or split in the middle of the web so that a system could be shut down. A break in the middle of the web would not be detected until the break increased to such an extent that it reached the edges. Since a considerable amount of time could pass before such a break was determined, a large waste of material would occur before the system was shut down. In addition, this may cause damage to the system due to snagging or trapping of the web in the guide rollers of the system.

It would therefore be desirable to provide an apparatus for detecting and guiding different width webs on a given edge and/or center line of travel which does not require manual adjustment of the sensing devices when the web width is changed. It would also be expedient to provide an apparatus with the capability of detecting a break in the middle of the web. This is achieved by the web detecting and guiding apparatus of the present invention by the provision of a web scanner bar unit which extends across the entire width of the web path and which has no moving parts. The web scanner bar unit is also utilized to determine a break in the middle of the web.

SUMMARY OF THE INVENTION

Accordingly, it is a general object of the present invention to provide an improved apparatus for detecting and guiding a web which is relatively simple to operate and maintain, but yet overcomes the disadvantages of the prior art devices.

It is an object of the present invention to provide an apparatus for detecting and guiding a web which includes a web scanner bar unit that extends across the entire width of the web path for controlling a steering mechanism to maintain a more precise edge and/or center alignment, thereby increasing product quality and decreasing waste of materials.

It is another object of the present invention to provide an improved apparatus for detecting and guiding a web which includes means for detecting a break in the middle of the web.

It is still another object of the present invention to provide an apparatus for detecting and guiding a web which includes web scanning means formed of an array of infrared light-emitting diodes and an array of phototransistors disposed on opposite sides of the web and extending across the entire width of the web path.

It is yet still another object of the present invention to provide an apparatus for detecting and guiding a web which includes a web scanner bar unit extending across the entire width of the web part and a microprocessor-based controller unit for determining the operation of the scanner bar unit.

In accordance with these aims and objectives, the present invention is concerned with the provision of an apparatus for detecting and guiding a web which includes a steering mechanism assembly, a light source, a photosensitive detector and an electronic controller unit. The steering mechanism assembly is used to control the lateral position of the web with respect to a desired line of travel. The light source is positioned on one side of the web and extends across the entire width of a path to be travelled by the web for directing a light beam onto the web. The photosensitive detector is positioned on the opposite side of the web and also extends across the entire width of the path to be travelled by the web. The photosensitive detector receives the light beam from the light source to provide a first signal indicative of the right edge of the web and a second signal indicative of the left edge of the web.

The electronic controller unit is responsive to the first and second signals for generating a control signal indicative of any deviation between the desired line of travel and the actual lateral position of the web. The steering mechanism assembly is responsive to the control signal for repositioning the lateral position of the web so as to cause it to move along the desired line of travel.

In another aspect of the invention, the apparatus for detecting and guiding the web includes web break detecting means for indicating a break in the middle of the web.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 2 is a more detailed block diagram of the web scanner bar unit and microprocessor-based controller unit of FIG. 1;

FIG. 3 is a front elevational view of the web scanner bar unit, constructed in accordance with the principles of the present invention.

DESCRIPTION OF THE PREFERRED EMBODIMENT

Figure 1:
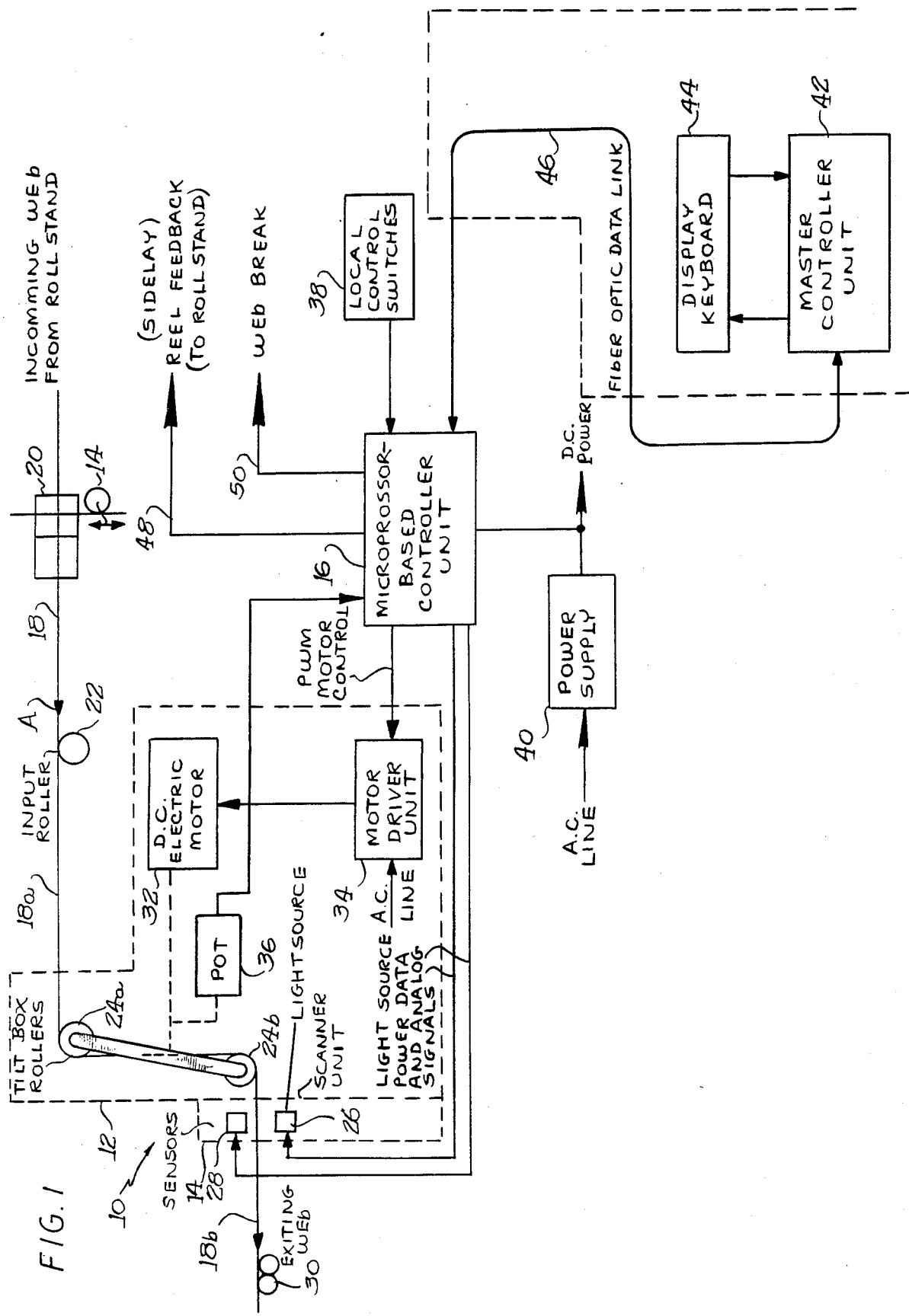
FIG. 1 is a simplified block diagram, partly diagrammatic, illustrating an apparatus for detecting and guiding a web, constructed in accordance with the principles of the present invention.

Referring now to FIG. 1 of the drawings, there is illustrated a simplified block diagram of an apparatus 10 for detecting and guiding a web, constructed in accordance with the principles of the present invention. The present invention is particularly suited for use in connection with printing operations and is directed especially to web-type printing presses for continuously controlling the lateral position of the paper web as it passes through the press. The detecting and guiding apparatus 10 is comprised generally of a steering mechanism 12, a web scanner bar unit 14, and a microprocessor-based controller unit 16. A web or strip of material 18 to be guided is fed in the direction or arrow A from a splicer or rollstand 20 to an input roller 22. It will be noted that the web 18 has an entering span 18a and an exiting span 18b.

The web 18 is initially passed through a steering roller assembly, such as tilt box rollers 24a, 24b for correcting the lateral position of the web so that it does not deviate more than a predetermined distance from either side of an established line. The established line on which the web is designed to travel or be guided along may be one edge of the web or a line taken through the center of the web. In particular, the web is passed over the upper steering roller 24a and underneath the lower steering roller 24b. Downstream of the steering roller assembly, there is located the web scanner bar unit 14 which is formed of a light source section 26 located below the web and a sensor and decoding logic section 28 located above the web. The exiting span 18b, which has been aligned for a desired course of travel, is delivered out to the guide rollers 30.

In addition to the steering roller assembly, the steering mechanism 12 includes a D.C. electric motor 32 for turning a low friction leadscrew so as to vary the angle of rotation of the steering rollers 24a, 24b relative to the direction of movement of the web. In this manner, the exiting span 18b of the web downstream of the scanner bar unit 14 can be controlled so as to follow a predetermined path notwithstanding the lateral variations in the position of the entering span 18a. The electric motor 32 is controlled by a motor driver unit 34 which receives motor control signals from the microprocessor-based controller unit 16.

The microprocessor-based controller unit 16 receives input signals from the sensor and decoding logic section 28 for use in determining the position of the web. The controller unit 16 also receives an input signal from a precision potentiometer 36 indicative of the position of the rollers 24a, 24b. Local control switches 38 for setting the mode of operation of the apparatus 10 and a power supply 40 are further provided as inputs to the controller unit. As an option, a master controller unit 42 and a display keyboard 44 may be connected via a communication line 46 for allowing remote control of the microprocessor-based controller unit 16. The controller unit 16 generates an output signal on line 48 for operating a sidelay motor 19 associated with the rollstand 20 so as to reposition the entering span 18a of the web. The controller unit 16 also provides an output signal on line 50 for shutting down a press in the system due to the detection of a web break.

In FIG. 2, there is shown in more detail the microprocessor-based controller unit 16 and the web scanner bar unit 14 illustrated in FIG. 1. The controller unit 16 includes a central processing unit (CPU) chip 52 which can be, for example, a Motorola 6803 microprocessor having a RAM (random-access memory) built in for performing calculations and storage of information in accordance with well-known techniques. An erasable programmable read-only memory 54 (EPROM) is used to store a software program for directing all of the automatic functions of the web detecting and guiding apparatus 10. A non-volatile 2K RAM 56 is also provided for storing additional information, such as working tables.

An input/output parallel interface chip 58 can be such as an Intel 8255 parallel I/O chip which interfaces between the various input/output devices and the central processing unit chip 52. In particular, the interface chip 58 receives switch contact signals from the local control switches which have been buffered through optoisolator chips 60. An input signal indicative of when the press has reached twenty percent of full speed is also fed to the interface chip 58 via line 62. The interface chip is read by the central processing unit chip 52 to determine the state of the inputs. The interface chip 58 generates a first output on line 64 to turn on a sidelay relay 66, a second output on line 68 to turn on a stop press relay 70, a third output on line 72 to control the motor unit 34, and a fourth output on line 74 to turn on the light source section 26 of the web scanner bar unit 14.

A data buffer chip 76 such as a Motorola 74HC373 is coupled to the central processing unit chip 52 on bus line 78 and to the sensor and decoding logic section 28 via bus line 80. An analog-to-digital converter (ADC) chip 81 such as a National ADC0809 receives a first input from the sensor and decoding logic section 28 via bus line 82 and a second input from the precision potentiometer in the steering mechanism 12 via line 84. It will be noted that the central processing unit chip communicates with the analog-to-digital converter chip 81, interface chip 58, EPROM chip 54, and RAM chip 56 via the bidirectional bus 86 containing address, data and control signals. If the optional master controller unit 42 is provided, a fiber optic serial link 88 is used to interface the master controller unit with the central processing unit chip 52.

The light source section 26 of the web scanner bar unit 14 is comprised of an infrared light-emitting diode (LED) array 90 which extends across the entire width of the web path 92. The sensor and decoding logic section 26 of the scanner bar unit includes a phototransistor array 94 which is positioned across the entire width of the web path and is located opposite corresponding LED's in the array 90 for receiving a light beam therefrom. The sensor and decoding logic section 28 further includes a switch matrix 96 and shift registers 98 which allow the central processing unit chip 52 to select any groups of phototransistors in the array 94 to function as a sensitive area or sensitive "eyespot." The outputs of the selected phototransistors are switched by the switch matrix 96 to either of two buses in the line 82 and are fed into the ADC chip 81. The CPU chip 52 can read the ADC chip 81 to determine the amount of light received from the selected phototransistors.

An actual web detecting and guiding apparatus 10 constructed in accordance with the present invention is illustrated in FIG. 3 of the drawings. As can be seen, the web scanner bar unit 14 includes a lower horizontal mounting plate 102 for housing the light source section 26 between side frame members 104 and 106. The scanner bar unit 14 also includes an upper horizontal mounting plate 108 for housing the sensor and decoding logic section 28 between the side frame members. For the sake of illustration, it will be assumed that the widest width of web to be run is approximately forty inches. Thus, the width of the light source section 26 and the sensing and logic section 28 must be equal to or wider than forty inches so as to accommodate such web sizes.

For ease of manufacturing and assembly, the light source section 26 is formed of ten individual printed circuit board (PCB) modules 110, each being four inches. Each of the modules 110 contains sixteen light-emitting diodes. The sensor and decoding logic section 28 is formed of ten PCB modules 112, each being of four inches, and ten individual PCB modules 114, each being of four inches. The modules 112 contain sixteen phototransistors, and the modules 114 contain the switching matrix and shift registers. However, it should be understood to those skilled in the art that each of the modules 110, 112 and 114 can be made of any width and the individual modules could house any desired number of components.

Figure 4A:
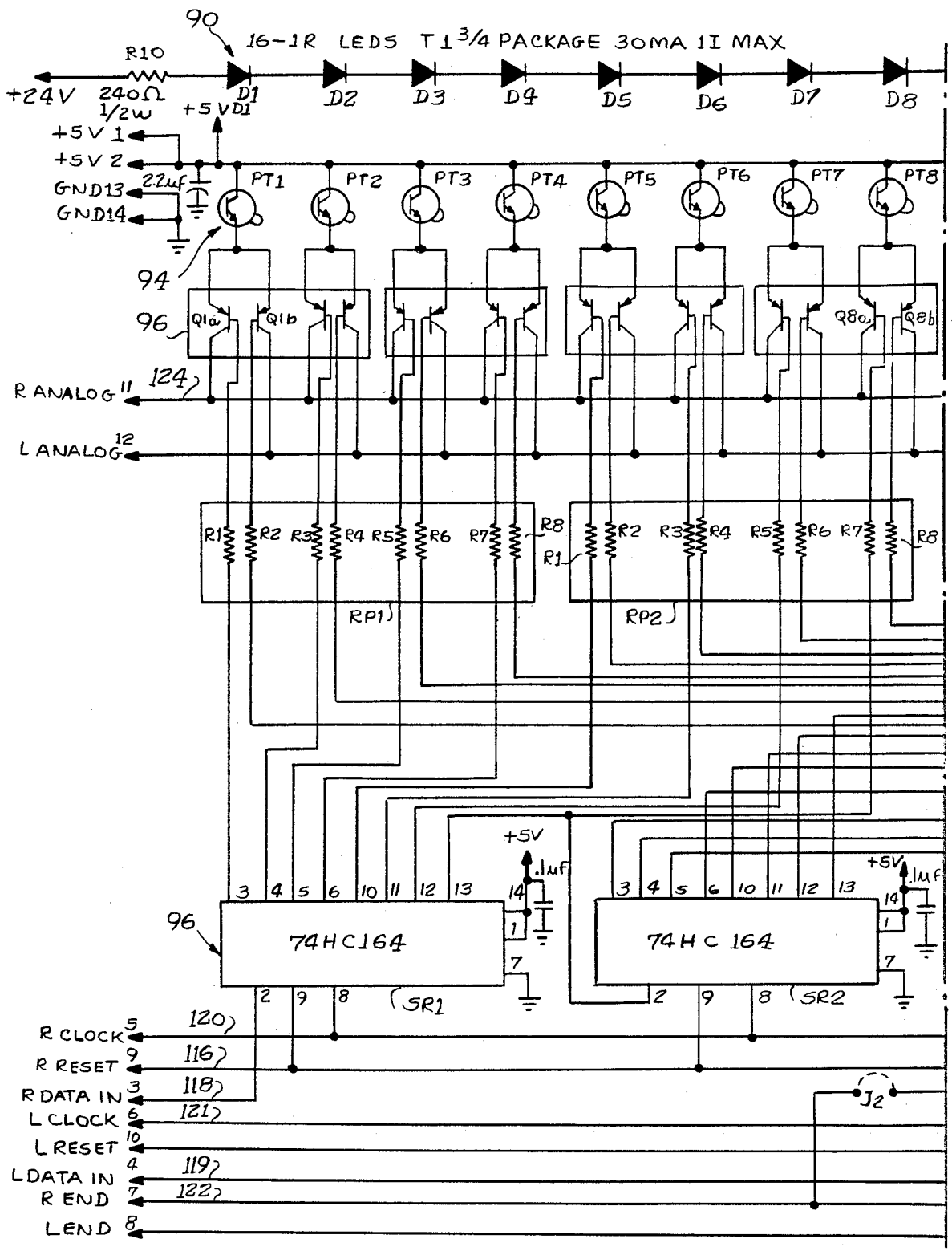
FIG. 4 is a schematic circuit diagram of one of the infrared LED modules, one of the phototransistor modules, and one of the sensor and decoding logic modules for use in the web scanner bar unit of the present invention.
Figure 4B:
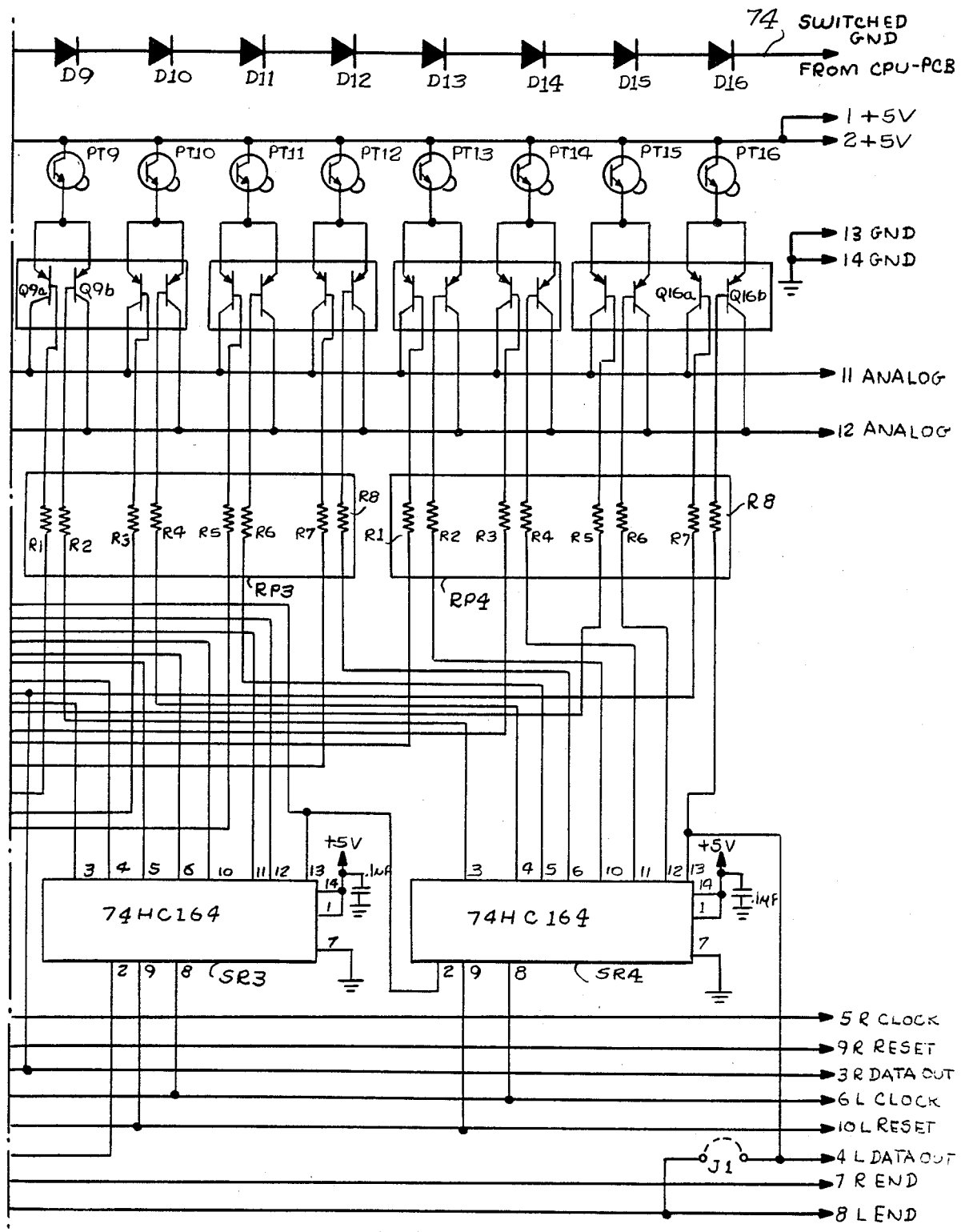

A schematic circuit diagram of one of each of the modules 110, 112 and 114 for use in the web scanner bar unit 14 is illustrated in FIG. 4. The LED module 110 includes a current-limiting resistor R10 and a string of sixteen series-connected infrared light-emitting diodes D1–D16. One end of the resistor R10 is connected to a supply potential (+24V) and the other end of the resistor R10 is connected to the anode of the diode D1 of the string. The cathode of the diode D16 is coupled to the CPU chip 52 via the line 74 and the interface chip 58 (FIG. 2). The phototransistor module 112 contains sixteen phototransistors PT1–PT16 which are aligned with corresponding ones of the LED's in the module 110 for receiving the light beam therefrom.

The switching matrix and shift register module 114 includes sixteen pair of PNP switching transistors (Q1a, Q1b ... Q16a, Q16b), four resistor packages RP1–RP4, each having eight resistors R1–R8, and four 8-bit shift registers SR1–SR4 such as Motorola 74HC164. The right shift register SR1 receives right data input signals on pin 2 via R DATA IN terminal, a right reset signal on pin 9 via R RESET terminal, and a right clock signal on pin 8 via R CLOCK terminal. The shift register SR1 provides the 8-bit parallel output on respective pins 3, 4, 5, 6, 10, 11, 12 and 13. The right shift register SR2 is similarly connected, except that it receives its data input signal on pin 2 from the pin 13 of the shift register SR1.

As can be seen, the first bit on pin 3 of the right shift register SR1 is coupled to the base of the switching transistor Q1a via the resistor R1 in the resistor package RP1. The emitter of the transistor Q1a is connected to one end of the phototransistor PT1, and the other end of the phototransistor PT1 is connected to the supply potential. The collector of the transistor Q1a is connected to R ANALOG terminal. The R ANALOG terminal corresponds to one of the buses which is fed to the ADC chip 81 via the line 82 (FIG. 2). Similarly, the remaining fifteen bits from the right shift registers SR1 and SR2 are connected to the respective base limiting resistors, switching transistors Q2a ... Q16a, and phototransistors PH2–PH16.

The first bit on pin 3 of the left shift register SR3 is coupled to the base of the switching transistor Q1b via the resistor R2 in the resistor package RP1. The emitter of the transistor Q1b is also connected to one end of the phototransistor PT1. The collector of the transistor Q1b is connected to L ANALOG terminal. The L ANALOG terminal corresponds to the other bus which is fed to the ADC chip 81 via the line 82. Similarly, the remaining fifteen bits from the left shift registers SR3 and SR4 are connected to the respective base limiting resistors, switching transistors Q2b ... Q16b and phototransistors PH2–PH16.

The operation of the web scanner bar unit 14 will now be described in connection with FIG. 4 as to how any groups of phototransistors PH1–PH16 can be selected to be the sensitive area or sensitive "eyespot" and how the edges of the web can be found. Prior to setting up the right eyespot, the CPU chip 52 will cause the LED array 90 to be turned on by applying a control signal on the line 74 and will cause all of the shift registers to be reset by applying a reset signal on the R RESET terminal on line 116.

Thus, all of the output bits from the right shift registers SR1 and SR2 will be at a low logic level and all of the phototransistors PH1–PH16 will be turned on via the respective switching transistors Q1a, Q2a ... Q16a. The CPU chip 52 will then apply a high logic signal on R DATA IN terminal via line 118 and will clock in pulses on the R CLOCK terminal via line 120 until a high logic level is sensed on the R END terminal via line 122. This procedure allows the CPU chip 52 to determine the width of the web scanner bar unit 14 by counting the number of clock pulses before the R END terminal on the line 112 is changed to the high logic level.

Next, the CPU chip 52 under the control of the stored program will determine the number of phototransistors to be grouped together and used as a first sensitive area defining the right eyespot. For example, if the right eyespot is to be formed of a group of three phototransistors PH1, PH2, and PH3, then the data signal on the R DATA IN on line 118 will be made low and three clock pulses will be sent to the R CLOCK terminal on line 120. If a group of five phototransistors such as PH1 through PH5 are used to form the right eyespot, then five clock pulses would be applied and so on.

With three clock pulses, it can be seen that the phototransistors PH1–PH3 will be turned on via the respective switching transistors Q1a, Q2a and Q3a. It will be noted that the sum of the collector current from these three switching transistors will be provided on the R ANALOG terminal on line 124. This analog signal is sent to the ADC chip 81 and converted to a digital signal which can be read by the CPU chip 52 and then stored.

In order to find the right edge of the web, the data input on the R DATA IN terminal on the line 118 will be made high and additional clock pulses will be applied for sequentially scanning the right eyespot across the phototransistor array 94 beginning at the operator or right side adjacent the frame member 104 and moving towards the gear or left side adjacent the sideframe member 106. This is continued until the analog current is decreased from the previous reading. This is the location of the right edge of the web. Both the analog current and location of the right edge are stored for later use. It will be understood by those skilled in the art that the band of light from the LED array 90 projected onto the corresponding right eyespot will become partially blocked due to the right edge of the web which reduces the sum of the analog current on the line 124.

Next, the CPU chip 52 will set up a second sensitive area defining a left eyespot in a manner similar to forming the right eyespot just described, but the second sensitive area will be moved initially just past the first sensitive area. In order to find the left edge of the web, the data input signal at L DATA IN terminal on line 119 will be made high and clock pulses will be applied to the L CLOCK terminal on line 121 for sequentially scanning the left eyespot toward the operator side or left side of the web until the analog current on L ANALOG terminal is increased from the previously stored reading. This is the location of the left edge of the web. Again, both the increased analog current reading and the location of the left edge are stored for later use. It will be appreciated by those skilled in the art that the band of light which was partially blocked by the right edge of the web will become unblocked, thereby again increasing the sum of the analog current.

When the web scanning bar unit 14 of the present invention is employed as a means to control the web 18 from deviating a predetermined distance in response to either the position of one edge of the web or the center line of the web, with the press running at above twenty percent of its full speed the CPU chip 52 reads periodically (approximately fifty times a second) the analog current on R ANALOG terminal corresponding to the right eyespot and the analog current on the L ANALOG terminal corresponding to the left eyespot and further compares these values with the earlier stored readings. Any differences represent an error in the web position. The control signal on the line 72 will be a pulse-width modulated signal which will be generated and sent to the motor driver unit 34 for causing the motor 32 to drive the steering mechanism 12 in the proper direction to minimize the error and restore the web to its original desired position of travel.

The precision potentiometer 36 connected to the steering mechanism 12 allows the CPU chip 52 to keep track of the tilt of the steering mechanism 12. If the tilt exceeds a predetermined value, the CPU chip 52 will attempt to move the rollstand or splicer 20 via the line 64 and the sidelay relays 66. If the tilt is further increased, further movement of the electric motor 32 is prevented in that direction. Further, limit switches 31 (FIG. 2) are provided so as to prevent damage to the steering mechanism 12 in case of a failure in the microprocessor-based controller unit 16.

In addition, a web-break check is performed by the CPU chip 52 under the control of the stored program after each time it finishes with reading of the right and left eyespots. This is achieved by clearing the first sensitive area and reforming one large eyespot using the right eyespot equal to a width of approximately three to five inches smaller than the width of the web being run, as seen by the left and right eyespots. The CPU chip 52 takes a reading from this one large eyespot and compares it to a baseline reading taken at normal conditions. If the reading exceeds the baseline reading by a preset limit, a flag is sent by the CPU chip 52. When two successive cycles detect readings above the preset limit, this is an indication of a break in the middle of the web. As a result, the CPU chip will turn off the press stop relay 70 via the line 68 and stop the operation of the presses. In this manner, the web scanner bar unit 14 is used to detect a break anywhere in the intermediate area of the web 18.

From the foregoing detailed description, it can thus be seen that the present invention provides an improved apparatus for detecting and guiding a web which includes a web scanner bar unit that extends across the entire width of the web path for controlling a steering mechanism to maintain a more precise edge and/or center alignment. The scanner bar unit is formed of a LED array section and a phototransistor array section disposed on opposite sides of the web. Further, there is provided a means of detecting a break in the web anywhere in the intermediate area thereof.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. An apparatus for detecting and guiding a web comprising:

steering mechanism means for controlling the lateral position of a web with respect to a desired line of travel;

a light source array formed of a plurality of individual light sources positioned on one side of the web and extending across the entire width of a path to be travelled by the web for directing a light beam onto the web;

a light-responsive array formed of a plurality of photosensitive elements positioned on the opposite side of the web and extending across the entire width of the path to be travelled by the web for receiving the light beam;

first logic means for grouping a first selected number of photosensitive elements together to form a right eyespot;

second logic means for grouping a second selected number of photosensitive elements together to form a left eyespot;

electronic processing means for sequentially scanning the right eyespot across the width of the web to provide a first signal indicative of the right edge of the web;

said processing means sequentially scanning the left eyespot across the width of the web to provide a second signal indicative of the left edge of the web;

said processing means including means for calculating an error signal from said first and second signals indicative of any deviation between the desired line of travel and the actual lateral position of the web; and said steering mechanism means responsive to said error signal for repositioning the lateral position of the web so as to cause it to move along the desired line of travel.

2. An apparatus for detecting and guiding a web as claimed in claim 1, wherein said steering means includes a tilt box roller assembly, a D.C. electric motor and a motor driver unit, said roller assembly being engaged with the web to control its lateral position, said roller assembly being driven by said electric motor, said motor driver unit being responsive to said error signal for controlling said electric motor.

3. An apparatus for detecting and guiding a web as claimed in claim 1, wherein said plurality of light sources is comprised of infrared light-emitting diodes.

4. An apparatus for detecting and guiding a web as claimed in claim 3, wherein said plurality of photosensitive elements is comprised of phototransistors.

5. An apparatus for detecting and guiding a web as claimed in claim 4, wherein said right eyespot is formed of a first group of three phototransistors.

6. An apparatus for detecting and guiding a web as claimed in claim 5, wherein said left eyespot is formed of a second group of three phototransistors.

7. An apparatus for detecting and guiding a web as claimed in claim 1, wherein said first logic means is comprised of first shift register means and first switch means for turning on said first selected number of photosensitive elements.

8. An apparatus for detecting and guiding a web as claimed in claim 7, wherein said second logic means is comprised of second shift register means and second switching means for turning on said second selected number of photosensitive elements.

9. An apparatus for detecting and guiding a web as claimed in claim 1, wherein said electronic processing means comprises a microprocessor-based controller unit.

10. An apparatus for detecting and guiding a web as claimed in claim 9, further comprising a master controller unit for communicating with said microprocessor-based controller unit via a fiber optic data link.

11. An apparatus for detecting and guiding a web as claimed in claim 1, further comprising means for grouping a third selected number of photosensitive elements together to form one large eyespot for detecting a break in the middle of the web.

12. An apparatus for detecting and guiding a web as claimed in claim 11, wherein said one large eyespot extends substantially across the intermediate area of the web between said first and second eyespots.

13. An apparatus for detecting and guiding a web as claimed in claim 12, wherein said electronic processing means includes means for reading the intermediate area of the web and for generating a web break signal to stop the operation of a printing press.

14. An apparatus for detecting and guiding a web comprising:
steering mechanism means for controlling the lateral position of a web with respect to a desired line of travel;
a light source array formed of a plurality of individual light sources positioned on one side of the web and extending across the entire width of a path to be travelled by the web for directing a light beam onto the web;
a light-responsive array formed of a plurality of photosensitive elements positioned on the opposite side of the web and extending across the entire width of the path to be travelled by the web for receiving the light beam;
first logic means for grouping a first selected number of photosensitive elements together to form a right eyespot;
second logic means for grouping a second selected number of photosensitive elements together to form a left eyespot;
means for grouping a third selected number of photosensitive elements together to form one large eyespot;
electronic processing means for sequentially scanning the right eyespot across the width of the web to provide a first signal indicative of the right edge of the web;
said processing means sequentially scanning the left eyespot across the width of the web to provide a second signal indicative of the left edge of the web;
said processing means including means for calculating an error signal from said first and second signals indicative of any deviation between the desired line of travel and the actual lateral position of the web;
said steering mechanism means responsive to said error signal for repositioning the lateral position of the web so as to cause it to move along the desired line of travel; and
said processing means further including means for reading said one large eyespot to provide a third signal and web break means responsive to said third signal for generating a web break signal indicative of a break in the middle of the web.

15. An apparatus for detecting and guiding a web as claimed in claim 14, wherein said steering means includes a tilt box roller assembly, a D.C. electric motor and a motor driver unit, said roller assembly being engaged with the web to control its lateral position, said roller assembly being driven by said electric motor, said motor driver unit being responsive to said error signal for controlling said electric motor.

16. An apparatus for detecting and guiding a web as claimed in claim 14, wherein said plurality of light sources is comprised of infrared light-emitting diodes.

17. An apparatus for detecting and guiding a web as claimed in claim 16, wherein said plurality of photosensitive elements is comprised of phototransistors.

18. An apparatus for detecting and guiding a web as claimed in claim 14, wherein said electronic processing means comprises a microprocessor-based controller unit.

19. An apparatus for detecting and guiding a web comprising:
steering means for controlling the lateral position of the web with respect to the desired line of travel;
light source means positioned on one side of the web and extending across the width of a path to be travelled by the web for directing a light beam onto the web;
photosensitive means positioned on the opposite side of the web and extending across the entire width of the path to be travelled by the web for receiving the light beam to provide a first signal indicative of the right edge of the web and a second signal indicative of the left edge of the web;
electronic control means responsive to said first and second signals for generating a control signal indicative of any deviation between the desired line of travel and the actual lateral position of the web; and said steering mechanism means responsive to said control signal for repositioning the lateral position of the web so as to cause it to move along the desired line of travel.

20. An apparatus for detecting and guiding a web as claimed in claim 19, further comprising web break means for generating a web break signal indicative of a break in the middle of the web.

* * * * *